June 12, 1962
J. W. COLTON
3,038,315
CHEMICAL PROCESS
Filed Oct. 2, 1958
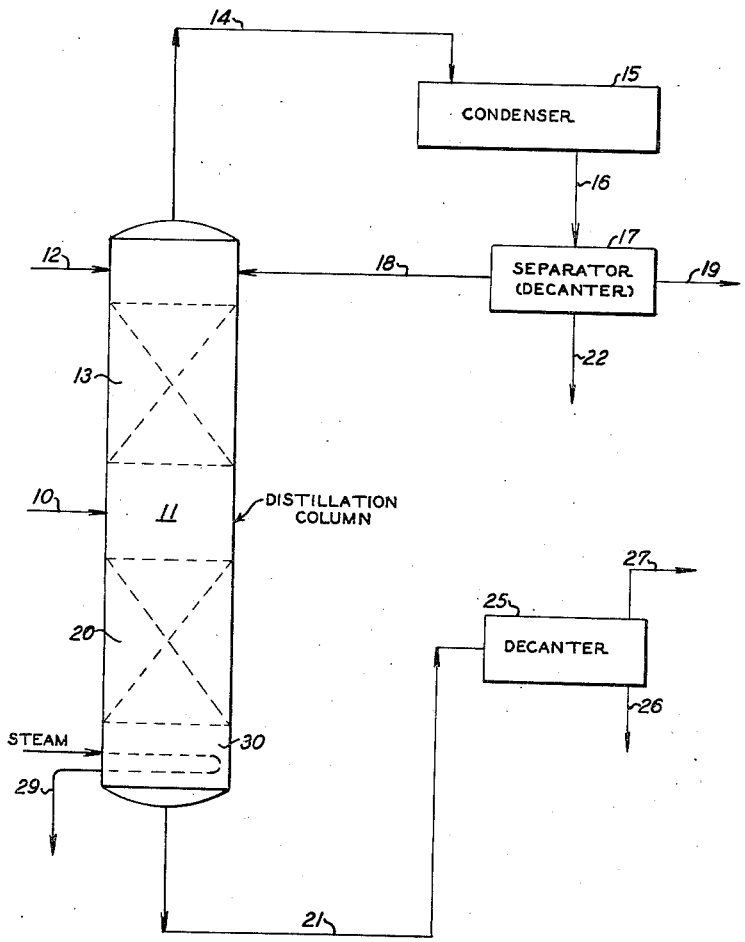
INVENTOR
JOHN WHITE COLTON
BY
ATTORNEY United States Patent Office 3,038,315
Patented June 12, 1962

3,038,315
CHEMICAL PROCESS
John White Colton, Pelham Manor, N.Y., assignor to Scientific Design Company, Inc., New York, N.Y., a corporation of Delaware
Filed Oct. 2, 1958, Ser. No. 764,875
6 Claims. (Cl. 62—20)

This invention is concerned with processes for the manufacture of isoprene. More particularly, this invention is concerned with methods for purifying isoprene containing low-boiling hydrocarbons and water vapor. Further, this invention is concerned with processes for the purification of isoprene containing low-boiling hydrocarbons comprising introducing a compound boiling lower than isoprene but higher than the hydrocarbons into the mixture, separating the low-boiling hydrocarbons by distillation, and recovering isoprene from the solution. Particularly, the invention is concerned with utilizing an organic compound boiling in the range of from about 5° to about 30° C. in the purification of isoprene. Water immiscible compounds are desirable. Water miscible compounds which do not azeotrope with water are preferred. Acetaldehyde is illustrative of the preferred compounds.

It is known in the art that low-boiling hydrocarbons may be separated from isoprene by ordinary distillation in which the low-boiling hydrocarbons are vented from the top of the distillation column with deep level refrigeration employed on a partial condenser to provide reflux. Unfortunately, the presence of water in the isoprene stream containing the light (low-boiling) hydrocarbons causes serious problems because deep level refrigeration cannot be used. Inasmuch as low-boiling hydrocarbons will condense at a temperature lower than the freezing point of water, supplying sufficient refrigeration to separate isoprene by condensation will cause freezing of the water in the condenser, thereby plugging up the tubes and preventing proper operation of the condenser.

It is known to compress the vapor stream containing isoprene, light hydrocarbons and water vapor to several atmospheres pressure so that reflux may be condensed from the light hydrocarbons even at temperatures just above the freezing point of water. However, such methods are not desirable in many operations because distillations at high temperatures will be required. At such temperature polymerization of some of the organic materials present in the mixture may occur and this will result in deposition of polymeric substances on the walls of the distillation equipment. In such instances, the addition of an inhibitor to the mixture would be required to prevent polymerization. The use of inhibitors is frequently undesirable since these materials must be separated from isoprene in order to obtain a purified product and their presence makes the separation and recovery of isoprene more difficult. Moreover, compression of the vapor stream is infeasible in laboratory and small pilot plant operations since such small scale operations are difficult to control and proper compression equipment is usually unavailable to achieve desired results.

It is another feature of this invention to have the overhead vent gases contain little or no water vapor, thereby allowing deep level refrigeration of these vent gases after leaving the isoprene recovery column for recovery of other hydrocarbon values. The absence of water vapor in the overhead eliminates the problem of water freezing out in the condenser causing plugging up of the tubes.

It is another feature of the present invention to use acetaldehyde as the water-miscible organic compound.

Acetaldehyde is a very advantageous organic compound which may be employed for this purpose, since it is the most readily available compound boiling between the range of 5° C. to 30° C. Its boiling point of 21° C. is well below that of both isoprene and water. Utilization of acetaldehyde prevents the presence of water vapor in the overhead vent gases. Further, acetaldehyde is the cheapest material available in terms of dollars per pound mol. In addition, it is completely miscible with both hydrocarbons and water, it is low in toxicity, non-corrosive and of low freezing point.

The FIGURE is a schematic illustration of a preferred embodiment of the invention.

Referring to FIG. 1, a vapor stream obtained by quenching the effluent of a cracking unit containing isoprene, water vapor and low-boiling hydrocarbons such as methane, ethane, propylene, butanes, together with traces of pentanes and pentenes, hexanes and hexenes, is passed through line 10 into distillation column 11. An organic compound boiling in the range of from about 5° to about 30° C., illustratively acetaldehyde, is added to the distillation column 11 through line 12, disposed above the level of line 10, preferably at the top of the column 11. The downwardly flowing compound contacts the upwardly flowing low-boiling hydrocarbons in the packed or first fractionation zone 13. The overhead from the distillation column 11 containing low-boiling hydrocarbons and said organic compound is passed through line 14 into condenser 15 and thence through line 16 to separator (decanter) 17. The uncondensed gases consisting mainly of hydrogen, methane, ethane, propylene, butanes and said organic compound, is condensed and in the event a non-water-miscible organic compound is utilized and water collects in separator 17, the water is removed through line 22 and the organic compound returned to the column through line 18. The remaining uncondensed gases are vented through line 19. An inventory of said organic compound is maintained in the condenser and reflux system with make-up being added through line 12. When utilizing acetaldehyde as the organic compound, the water and crude isoprene in the feed entering column 11 through line 10 passes downwardly through packed or second fractionation zone 20 and collects in the bottom 30 of the fractionating column 11 and is passed through line 21 into decanter 25. The aqueous phase is discarded through line 26. The hydrocarbon phase is withdrawn as crude product through line 27. The heat input through column 11 is supplied through coil 29.

The invention is illustrated by but not restricted to the following embodiments.

As used herein parts and percentages are by weight, unless otherwise specified.

*Example 1*

6.63 lbs./hr. of a hydrocarbon gas stream containing isoprene together with 4.35 lbs./hr. of water vapor are passed out of a cracking furnace at a temperature of 800° C. The gases are quenched to bring the temperature down to approximately 40° C. The resulting liquid and vapor mixture is passed into a fractionating column 5 inches in diameter at a point between a first packed zone 72 inches high and a second packed zone 30 inches high. The column is equipped with a refrigerated partial condenser for the overhead which, in turn, is connected to a separator. The separator enables return of the organic compound to the top of the column for reflux, for decantation of any aqueous phase, and removal of vapor phase. The bottom of the column is equipped with a steam-heated reboiler and bottoms take-off and is connected to a decanter for separation of aqueous and hydrocarbon phases. The column packing is ¼ inch ceramic Raschig rings.

An inventory of acetaldehyde is maintained in the first zone and reflux system and make-up acetaldehyde is added at a rate of 2.59 pounds per hour. The overhead from the column is passed through a condenser which contains emerging gases and condensate at 50° C. Uncondensed gases consisting mainly of hydrogen, ethane, methane, propylene, butanes and acetaldehyde are discharged from the system through vent line 19 at the rate of 7.74 pounds per hour. All of the condensate is returned to the column as reflux. The water in the feed and hydrocarbons collect at the bottom of the column and are discharged therefrom at the rate of approximately 9.19 pounds per hour. There is separated 4.35 pounds per hour of water and 4.82 pounds per hour of crude product. This crude product contains approximately 0.02 pound per hour of acetaldehyde, 1.61 pounds per hour of 5 carbon atom hydrocarbons, including principally isoprene and 3.19 pounds per hour of heavier hydrocarbons. The overhead vent gases contain virtually on water vapor and no freezing of water is observed to take place in the condensate phase even when the refrigeration is maintained at below 0° C. Substantially all of the isoprene is recovered as crude product from the hydrocarbon phase in the bottom section of the column.

*Example 2*

2.02 pounds per hour of a hydrocarbon gas stream containing isoprene together with 1.42 pounds per hour of water vapor are passed out of a cracking furnace at a temperature of 800° C. These gases are quenched to bring the temperature down to approximately 40° C. The resulting liquid and vapor mixture is passed into the fractionating column described in Example 1. Neopentane is utilized in place of the acetaldehyde utilized in Example 1 and is added to the system at a rate of 14.0 pounds per hour. The condenser is operated with the refrigeration being maintained at above 0° C. The uncondensed gases as described in Example 1 are discharged from the system at the rate of 14.39 pounds per hour, including approximately 0.03 pound per hour of water vapor. There is removed from the separator aqueous phase in the amount of 1.39 pounds per hour. The bottoms of the column contain 1.85 pounds per hour of crude product containing approximately 1.13 pounds per hour of $C_5$ hydrocarbons including principally isoprene, and 0.72 pound per hour of heavier hydrocarbons. It will be observed that in this example, the overhead gases contain water vapor as compared to Example 1, wherein acetaldehyde was utilized. Thus, while this Example 2 enables separation of hydrocarbons having less than 5 carbon atoms per molecule, a mixture comprising isoprene exit gases cannot be further refrigerated for the recovery of valuable hydrocarbon fractions without drying.

The acetaldehyde as used in Example 1 is illustrative of the water-miscible non-azeotroping-with-water organic compounds boiling in the range of about 5° C. to about 30° C. contemplated by the present invention. Neopentane as used in Example 2 is illustrative of the water-immiscible compounds contemplated by the present invention. Substitution of various other organic compounds, such as ethylamine, dimethylamine and acetaldehyde in the procedure of Example 1 enables separation as therein obtained. Substitution of such organic compounds as ethylchloride, trichloro-monofluoromethane, dichloro-monofluoromethane, 2-chloropropylene, cyclobutane, methyl cyclopropane and dimethyl cyclopropane for the neopentane utilized in Example 2 enables the separation there obtained. Such compounds as methyl ethyl ether and methyl mercaptan are illustrative of organic compounds boiling in the range of from about 5° to about 30° C. which are partially soluble in water and which azeotrope with water which can be used in the process of the present invention. It will be realized that use of such latter compounds results in separation of water in both overhead and bottoms of the distillation column.

It is intended that utilization of this invention should not be limited to the column design noted in Example 1 as columns of other dimensions and other corrosion-resistant packing materials can be employed to effect the desired recovery. Obviously, the selection and sizes of materials, column diameter and height and gas composition will be dependent upon the particular process employed for the manufacture of isoprene.

In view of the foregoing disclosure, variations and modifications thereof will be apparent to one skilled in the art, and it is intended to include within the invention all such variations and modifications except as do not come within the scope of the appended claims.

What is claimed is:

1. A process for the separation of light hydrocarbons from an isoprene-containing mixture comprising isoprene, light hydrocarbons and water, which comprises feeding said mixture into a distillation column intermediate the ends thereof, separately adding into said column an organic compound boiling in the range 5° to 30° C. and having a volatility intermediate the volatilities of said light hydrocarbons and said isoprene, and separating said mixture into an overhead fraction of light hydrocarbons and said added compound and a bottom fraction of product isoprene, said water being incorporated substantially in one of said fractions.

2. The process of claim 1, wherein said organic compound is water miscible and non-azeotroping with water and said water is incorporated in said bottom fraction.

3. The process of claim 1, wherein said organic compound is water-immiscible and said water is incorporated in said overhead fraction.

4. A process for the separation of light hydrocarbons from an isoprene-containing mixture comprising isoprene, light hydrocarbons, and water which comprises feeding said mixture into a distillation column intermediate the ends thereof, separately adding acetaldehyde to the column above the point of introduction of said mixture, distilling the mixture, separating an overhead fraction of light hydrocarbons and acetaldehyde which is substantially free of water, and separating a bottom fraction containing isoprene and water.

5. The method of claim 4 wherein the said overhead fraction is refrigerated to condense light hydrocarbons.

6. In a process for the separation of a mixture containing isoprene, lighter than $C_5$ hydrocarbons and water involving distillation and the use of refrigeration condensation of reflux, the improvement which comprises introducing said mixture into a distillation column intermediate the ends thereof, separately adding acetaldehyde to the column above the point of introduction of said mixture distilling the mixture, separating an overhead fraction of light hydrocarbons and acetaldehyde which is substantially free of water, and separating a bottom fraction containing isoprene and water.

References Cited in the file of this patent

UNITED STATES PATENTS

| | | |
|---|---|---|
| 2,339,560 | Simo et al. | Jan. 18, 1944 |
| 2,366,360 | Semon | Jan. 2, 1945 |
| 2,366,361 | Semon | Jan. 2, 1945 |
| 2,371,342 | Mayfield | Mar. 13, 1945 |
| 2,566,992 | Morgan | Sept. 4, 1951 |
| 2,567,228 | Morrell | Sept. 11, 1951 |
| 2,600,106 | Garrett | June 10, 1952 |
| 2,614,969 | Morrell et al. | Oct. 21, 1952 |
| 2,623,844 | Scheeline | Dec. 20, 1952 |
| 2,690,989 | Bottenberg | Oct. 5, 1954 |
| 2,732,414 | Stoops | Jan. 24, 1956 |